United States Patent [19]

Langley

[11] Patent Number: 5,560,974
[45] Date of Patent: Oct. 1, 1996

[54] BREATHABLE NON-WOVEN COMPOSITE BARRIER FABRIC AND FABRICATION PROCESS

[75] Inventor: John D. Langley, Guntersville, Ala.

[73] Assignee: Kappler Safety Group, Inc., Guntersville, Ala.

[21] Appl. No.: 370,614

[22] Filed: Jan. 10, 1995

Related U.S. Application Data

[63] Continuation-in-part of Ser. No. 87,003, Jul. 2, 1993, Pat. No. 5,409,761, which is a continuation-in-part of Ser. No. 673,742, Mar. 22, 1991, abandoned.

[51] Int. Cl.$^6$ ............................ A41D 13/12; A61B 19/08; B32B 5/32; B32B 7/04; B32B 31/20
[52] U.S. Cl. ................ 428/198; 2/901; 128/849; 156/73.1; 156/291; 422/34; 428/286; 428/315.5; 428/315.7; 428/315.9; 428/340
[58] Field of Search ..................... 2/901; 128/849; 156/73.1, 291; 422/34; 428/198, 286, 315.5, 315.7, 315.9, 340

[56] References Cited

U.S. PATENT DOCUMENTS 5,409,761  4/1995  Langley ................................ 428/198

Primary Examiner—James C. Cannon
Attorney, Agent, or Firm—Henry Croskell

[57] ABSTRACT

A breathable non-woven composite fabric having barrier capabilities to biological liquids comprised of at least one non-woven layer bonded to at least one surface of a thermoplastic microporous film, the non-woven composite fabric providing a barrier to passage of biological liquid when the composite fabric is subjected to contact with synthetic blood under the dictates of testing procedure ASTM ES21-92 and ES22-92 while maintaining a moisture of vapor transmission rate of greater than about 450 grams per square meter for 24 hours at about 75° F. and about 65% relative humidity, the non-woven composite fabric having a breaking strength of at least about 14 pounds. A process is provided for forming the non-woven composite fabric which has been adhesively bonded by unwinding and contacting at least one continuous thermoplastic non-woven web to at least one side of a continuous thermoplastic microporous film with spot adhesive or pattern adhesive applications between the film and webs, continuously transporting said contacted webs and film through a bonding and curing zone and bonding the webs and film at multiple spaced-apart locations, said bonding zone having a dwell time sufficient to cure the adhesive bond of the composite while avoiding degradation of the film and webs.

48 Claims, 1 Drawing Sheet

BREATHABLE NON-WOVEN COMPOSITE BARRIER FABRIC AND FABRICATION PROCESS

This application is a continuation-in-part of U.S. patent application Ser. No. 087,003, filed Jul. 2, 1993, now U.S. Pat. No. 5,409,761 which is a continuation-in-part of U.S. patent application Ser. No. 673,742, filed Mar. 22, 1991, now abandoned.

FIELD OF THE INVENTION

This invention relates to breathable non-woven composite barrier fabrics which are impervious to water-based liquids such as body fluids but which allow passage of water vapor. Applications for such fabrics exist in the field of protective garments for medical technicians, laboratory workers, and the like where it is desired to prevent passage of blood or other body fluids to the body of the worker or from the worker to the patient while allowing passage of water vapor. Garments with such characteristics provide enhanced comfort for the wearer by allowing perspiration to escape, consistent with maintaining a barrier to passage of liquids.

This invention further relates to a breathable non-woven composite barrier fabric and fabrication process for the fabric wherein a non-woven web layer is adhesive bonded to a microporous film of polyolefin materials either on one side only or on both sides of the microporous film. The breathable non-woven composite barrier fabric provides performance characteristics in terms of vapor transmission, body fluid blockage and necessary strength by selection of materials having specific physical properties for the respective layers and the microporous film which are thermally bonded into a composite fabric. Fabrics employing the invention are effective for use in protective garments where stoppage of body fluids such as blood, along with enhanced comfort and permeability to vapors produced by perspiration. The composite fabric may be fabricated from available materials inclusive of non-woven webs and microporous films that are readily fabricated utilizing continuous webs and microporous film which are continuously transported in contact through a thermal bonding zone achieving a composite fabric with multiple spaced-apart thermal bonds, said bonds being provided while avoiding burn-through degradation of the film and webs, thereby forming the thermally bonded non-woven composite fabric.

Microporous films have a structure that enable vapors to flow through the films while blocking liquids. The effective pore size is at least several times the mean free path of the flowing molecules, namely from several micrometers down to about 100 angstroms. Such films are generally opaque, even when made of a transparent material because the surfaces of the internal structure scatter visible light. The term "microporous film" as used herein is inclusive of microporous membranes.

Microporous films and combinations of said films with various layer materials have been utilized in a wide variety of applications. The microporous films have been used individually in applications for filtration of solids, as diffusion barriers or separators in electrochemical cells and in the preparation of synthetic leather, or cloth laminates. Use as cloth laminates require permeability of water vapor while substantially blocking liquid water for applications such as synthetic shoes, raincoats and outerwear and the like. Microporous films are also utilized for filter cleaning antibiotics, beer, oils, bacteriological broths, microbiological samples, intravenous fluids, vaccines and the like. These films have also been utilized to make surgical dressings, bandages and other fluid transmissive medical applications. Such microporous films generally need to be laminated in order to fabricate garment materials for purposes of strength. The microporous films or membranes without lamination by web materials generally do not have sufficient strength to produce suitable garment materials.

Bonding methods for non-woven composites are a primary factor in determining the final properties of such composites. To fulfill the demands being made on non-woven composites by the multitude of end use markets, several bonding processes are employed. The simplest way to categorize these processes is chemical (adhesive), thermal and mechanical.

Adhesive or chemical bonding involves adding some sort of chemical to the web or the microporous film surface during lamination of the composite. This method requires heat treatment following application of the adhesives to dry, cure and fuse the binder.

A wide range of polymer families can be reacted using, for example, emulsion polymerization chemistry. In addition these adhesives can be utilized as in powder bonding. The web containing dry powder adhesive is conveyed through, for example, an infrared heating means wherein the powdered adhesive absorbs energy and melts in the zone of application to a viscous liquid.

Chemically or adhesively bonded non-woven composites are held together by using binders as the bonding agent. The properties of the finished non-woven composite products are a function of both the fibers, film and bonding system. Therefore, design of the binders used for the demanding end use applications of non-woven composites is of major importance. Since the binder (adhesive) plays a key role in performance, one needs to understand how the adhesive contributes to the finished non-woven composite product.

Many types of adhesive systems are in use today. Rubber and synthetic rubber are used, as are vinyl polymers and copolymers and acryllic ester polymers and copolymers and the like. Various resins, starches and even hot melted adhesives add to the total chemical adhesive list. These adhesive systems usually exist in aqueous dispersions but can be added to the non-woven composite materials as solutions or solids in thermal plastic form. Typical application methods include printing and spraying. Of all of the adhesive systems currently available to the nonwoven producer and non-woven composite producer, the most common is a latex or emulsion polymer.

Thermally bonded composites of microporous films, i.e., the combination of microporous film and web materials are frequently applied to situations requiring vapor permeability while presenting some form of barrier to the passage of water and/or aqueous solutions or aqueous suspensions, however, none of these materials have been found to be effective in combining strength of fabric, barrier limits defined by ASTM standards for passage of body fluids and sufficient breathability for utilization in medical garment fabrication.

BACKGROUND OF THE INVENTION

Breathable multi-layer barrier fabrics of various combinations of layered material are disclosed in prior art patents. U.S. Pat. No. 4,041,203, issued Aug. 9, 1977, to Brock et al., discloses a fabric made up of a mat of generally discontinuous thermoplastic microfibers as a top layer and a web of substantially continuous, randomly deposited polymer filaments as a bottom layer, the layers being bonded at intermittent discrete regions. A three-layer fabric having a mat layer on the outside and a web layer in the middle is also disclosed. The specific polymer materials used for the mat and the web include polyolefins such as polypropylene. U.S. Pat. No. 4,828,556, issued May 9, 1989, to Braun et al., discloses a multi-layer fabric having a first layer of porous melt-blown material, a second layer comprised of a non-microporous film of polyvinyl alcohol, and a third layer of porous non-woven material in the form of a spun-bonded or melt-blown web. The fabric of this reference is said to be useful for absorbent articles such as diapers. Numerous prior patents directed to microporous films are also disclosed and discussed in this reference. Impervious, absorbent barrier fabrics are disclosed in U.S. Pat. No. 4,379,192, issued Apr. 5, 1983, to Wahlquist et al., the fabric including layers having continuous filament webs, microfiber mats, and polymeric film, the mats providing an uncompacted absorbent center layer.

In addition, various orientated microporous films are presented in U.S. Pat. No. 4,867,881, issued Sep. 19, 1989, to Kevin E. Kinzer, which discloses a microporous article comprising a thermoplastic polymeric structure having a plurality of cells with adjacent cells being interconnected by passageways to provide a network of communicating pores with the structure being orientated in at least one direction. Laminated structures of these same microporous materials are presented having at least one other material laminated to the microporous film are disclosed is U.S. Pat. No. 4,539,256, issued Sep. 3, 1985, to Gene H. Shipman. Porous film composites are disclosed in U.S. Pat. No. 5,169,712, issued Dec. 8, 1992, to William T. Tapp wherein porous film composites having at least one layer of an orientated polymeric porous film comprised of ethylene-propylene co-polymers and other specific polymer requirements are disclosed. While numerous combinations of layers of various polymeric materials prepared in a desired physical form are disclosed in these references in combination with microporous films, the combination of an inner layer of microporous film and outer layers of non-woven materials which are thermally bonded into a composite fabric having minimum strength, vapor permeability and body fluid barrier capabilities as disclosed herein are not known to have been disclosed or suggested by the prior art.

Other porous film composites are disclosed in the Japanese Patent Application, Kokai, No. 63-276533, publication date Nov. 14, 1988, inventors Kawano et al., entitled "Laminated Film". The Japanese reference "Laminated Film" does not provide a liquid barrier in fact presents a filtered-type product which readily flows liquid and would be suitable for example as a separator in an electrochemical cell. A breathable non-woven composite barrier fabric for protective garments should provide for wear comfort by enabling passage of water vapor resulting from perspiration or humidity in the environment, as well as forming a barrier to passage of body fluids such as blood. For effectiveness in situations involving handling of patients, the barrier should be effective at elevated pressure to prevent the blood from being projected or soaked through the fabric. In addition, strength and durability are a necessity in the fabric as exemplified by breaking strength as defined by ASTM D751 (Grab Method) and Mullen burst test values.

SUMMARY OF THE INVENTION

The present invention discloses a breathable non-woven composite barrier fabric and a fabrication process for preparing said fabric. The fabric has unique performance characteristics of minimum levels regarding vapor permeability, barrier to passage of biological fluids and sufficient fabric strength to meet day-to-day requirements of the fabrics when utilized in garments. The non-woven composite fabrics are constructed of a microporous thermoplastic film having at least one film surface thermally bonded to a layer of non-woven thermoplastic materials, the film and layers being thermally bonded at multiple spaced-apart locations. These non-woven composite fabrics provide a barrier to passage of biological fluid when the composite fabric is subjected to contact with synthetic blood at 0 psi for 5 minutes followed by synthetic blood contact at 2 psi for 1 minute followed by synthetic blood contact at 0 psi for 54 minutes, the composite fabric exhibiting no visible penetration of the synthetic blood. This non-woven composite fabric performance meets the requirements of ASTM designation ES 21-92 entitled "Emergency Standard Test Method for Resistance of Protective Clothing Materials to Synthetic Blood" which is hereby incorporated by reference. Further, these non-woven composite fabrics provide a barrier to penetration by body fluid-borne pathogens using viral penetration as a test system. This non-woven composite fabric performance meets the requirements of ASTM designation ES22-92 entitled "Emergency Standard Test Method for Resistance of Protective Clothing Materials to Penetration by Blood-Borne Pathogens Using Viral Penetration as a Test System" which is hereby incorporated by reference. In addition to the barrier performance of the fabric, the fabric is capable of having a moisture or vapor transmission rate of greater than about 450 grams per square meter for 24 hours at a temperature of about 75° F. and a relative humidity of about 65%. These moisture or vapor transmission rates are determined by ASTM designation E96-80 entitled "Standard Test Methods for Water Vapor Transmission of Materials" and hereby incorporated by reference. The ASTM E96-80 test utilizes two testing methodologies, Upright Cup Method and Inverted Cup Method. In addition the fabrics according to the invention in order to be utilized as protective garments for example in the medical field must have a suitable strength such as a breaking strength of at least about 14 pounds.

It has been found that many thermally bonded non-woven composite fabrics do not meet this physical performance criteria readily due to burn-through of the thermal bonding thus disruption of the physical characteristics which are required. The thermal bonding of the composite fabric at multiple spaced-apart locations can be achieved by ultrasonic point bonding and one or more layers or webs can be utilized in combination with one or more microporous films. A process for forming the thermally bonded non-woven composite fabrics is also presented wherein the fabrics have these physical performance characteristics. The process includes unwinding and contacting at least one continuous thermoplastic non-woven web to at least one side of a continuous thermoplastic microporous film, continuously transporting said contacted webs and film through a thermal bonding zone. The thermally bonding of the webs and film are at multiple spaced-apart locations. The thermal bonding is achieved under control dwell time which allows appropriate bonding for strength basis and yet avoids burn-through degradation of the composite webs and film.

It has also been found that adhesive bonding of non-wovens to the microporous film in order to achieve a non-woven composite having the unique properties of a blood barrier while allowing reasonable moisture vapor transmission rates is possible using a variety of thermal plastic polymeric materials including polyolefins and copolymers of polyolefins and the like. In order to achieve adhesive bonding of the non-wovens and the microporous film; a non-continuous adhesive bonding is required which allows the functionality of the microporous film to continue, i.e. moisture vapor transmission rates while also providing strong bonding which allows for various fabric end use. Point or spot applications of the adhesives whether in liquid or powder form can achieve the goals of both the performance and strength. These multiple spaced-apart adhesive bonding applications accomplish the goals of the inventive materials, however patterned adhesive bonding such as a spider web bonding of thin lines can also be utilized. The "spider web" bonding pattern allows for numerous spaced-apart adhesive lines while yet allowing a majority of the non-woven to microporous film contact to be free of any adhesive.

It is, therefore, an object of this invention to provide a breathable non-woven composite barrier fabric comprised of thermoplastic materials which are fabricated through adhesive bonding and have capabilities for providing permeation of water vapor while simultaneously providing a barrier against passage of water-based fluids such as body fluids.

Another object of the invention is to provide such a fabric that provides a barrier to the passage of blood under the dictates of ASTM designation ES21-92, the current designation for use in medical and related protective garments.

Yet another object is to provide a breathable non-woven composite barrier fabric that can be fabricated using multiple spaced-apart adhesive bonding on readily available thermoplastic materials.

In still another object is to provide such a fabric that provides a barrier to viral penetration under the dictates of ASTM designation ES22-92, the current designation for use in medical protection garments.

Other objects and advantages of the invention will be apparent from the following detailed description and the appended claims.

DESCRIPTION OF THE PREFERRED EMBODIMENT

Figure 1:
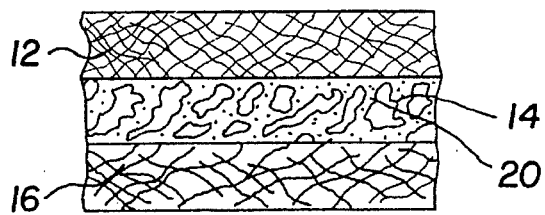
FIG. 1 is a diagrammatic representation of a cross-sectional view of a multi-layer composite fabric embodying the invention.
Figure 2:
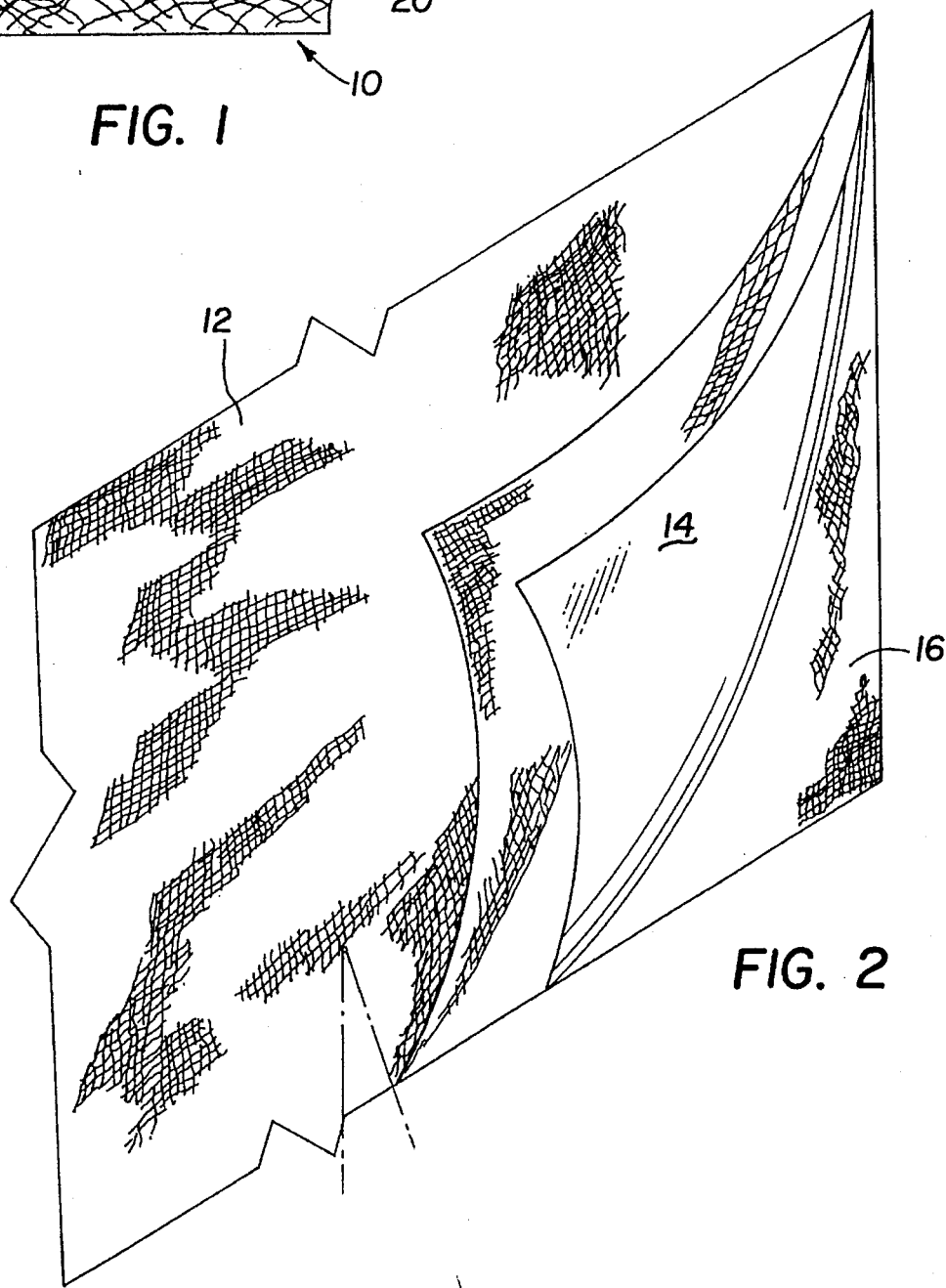
FIG. 2 is a schematic fragmentary perspective view, with portions peeled away, of the fabric of FIG. 1.
Figure 3:
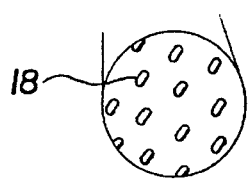

Referring to the drawings, there is shown a breathable non-woven composite barrier fabric 10 made up of three layers, a top layer 12 of a spun-bonded polyolefin, a middle layer 14 of a microporous thermoplastic film, and a bottom layer 16 of spun-bonded polyolefin. The three layers are secured to one another by adhesive bonding at spaced-apart points 18 throughout the fabric surface. The adhesive bonding can also be applied in line patterns, i.e. non-continuous, for example in a spider web pattern.

Top layer 12 may be comprised of a non-woven polyolefin with the microporous thermoplastic film middle layer 14 preferably being comprised of a polyolefin or any other thermoplastic materials which will accept point adhesive bonding and maintain the minimum performance levels as defined. As performance levels are achieved by strengthening the composite fabric by adhesive point or pattern bonding of the microporous film and webs thus avoiding adhesive closure of the porosity of the microporous film.

The non-woven thermoplastic layer of web materials have a weight of from about 0.2 to about 2.5 ounces per square yard with about 0.5 to about 1.0 being preferred. The non-woven layers are preferably spun-bonded providing strength to the composite fabric along with a cloth-like surface texture which enhances the use of the fabric for garments, as contrasted to film materials which have a smooth plastic surface. Spun-bonded polypropylene or polyethylene or co-polymers of polyolefins are suitable for use in the fabrication of the breathable non-woven composite barrier fabric and are available from various sources. Spun-bonded polyolefin suitable for this purpose is available from Poly-Bond, Inc. under the designation "Poly-Bond". Properties of such spun-bonded webs useful in accordance with the fabrication of the present fabric are achieved with a wide range of web weights, however suitable thermally bonded composites result from the lower weight webs as well as the higher weight webs. The nonwoven webs have a grab strength in machine direction of at least 6.5 pounds to break, cross-directional of at least 5 pounds to break and an elongation value of at least 52% machine direction and at least 72% cross-direction.

The bottom layer 16 may have the same composition as top layer 12, although top layer 12 and bottom layer 16 may be comprised of different materials and have different web weights and be suitable for utilization in the thermally bonded non-woven composite barrier fabric. The middle layer 14 is comprised of a microporous film of a thermoplastic material which maintains its porosity when adhesively bonded in fabrication of the composite with the webs or layers. Preferably the microporous film is comprised of polyolefins which are amenable to point or pattern adhesive bonding without experiencing blockage of composite barrier fabric moisture breathable properties. The polyolefin films have a microporous structure with extremely small random pores 20 extending through the film matrix, allowing vapor such as water vapor to pass through, while forming a barrier to passage of liquids such as body fluids. A suitable film material is available from 3M Disposable Products Division under the designation, "Scotch® microporous film." Properties of a designated film suitable for use in this invention are as follows: thickness, 1.5 mil; weight, 0.85 ounce per square yard; tensile strength at break (DPD Test Method 106), machine direction, 2,000 g/25 mm; cross direction, 950 grams/25 mm; elongation at break (DPD Test Method 106), machine direction, greater than 100 percent, cross direction, greater than 100 percent. Permeation/barrier properties include a moisture vapor transmission rate of greater than 5,000 grams per square meter per 24 hours at 75° F. and 50% relative humidity as measured by the inverted cup method; air permeability, less than 400 seconds/50 cc by Gurley Densometer® measurement and water hold-out, greater than 45 pounds per square inch as measured by Mullen burst test. Other microporous films having a moisture vapor transmission rate of greater than 1,500 g/m$^2$/24 hr. at 86° F. and 48 percent relative humidity as measured by ASTM E96 and water holdout greater than 50 psi are acceptable.

Thermoplastic polymers useful in the present invention include olefinic, condensation and oxidation polymers. Representative olefinic polymers include high and low basis weight polyethylene, polypropylene, polyvinyl containing polymers, butadiene containing polymers and the like. Condensation polymers include polyesters such as polyethylene terephthalate and polybutylene terephthalate, polyamides such as nylon 6, nylon 13 and nylon 66, polycarbonates and polysulfones. Polyphenylene oxide is representative of the oxidation polymers which can be used. Blends of thermoplastic polymers may also be used. However, while most of these thermoplastic polymers can be utilized in forming a suitable web for combining with microporous film, the microporous film must be comprised of polymeric materials, i.e. thermoplastics, which can survive adhesive bonding, ultrasonic point bonding and the like without degenerating thus losing the barrier properties and yet maintaining moisture vapor permeability.

A variety of product concepts can be fully developed through adhesive bonding technology to meet the needs of various markets for non-wovens, composites and laminated structures. Among the products that can be produced by adhesive bonding are flat non-wovens that compete with fabrics made from spun-bonded, and thermal calender bonded technologies. Adhesive bonded fabrics are soft and drapable, similar to calender bonded products but can be made from a range of fiber types and at heavy weights with improved strength. Non-woven composites developed from adhesive technology meet market demands for both durable and disposable end uses.

ROUTES TO ADHESIVE LAMINATION

Modern substrate adhesive lamination is usually aimed at using the adhesive in three different forms: solvent borne solutions; aqueous dispersions; and 100% solid adhesive application techniques.

The advantages of solid adhesive application are their versatile adhesive performance characteristics, the improved economy which results from the elimination of a carrier which must be removed during the bonding process with additional expenditure of energy, and the potential environmental problems connected with the use of solvents. The use of thermoplastic solid adhesive, also assists the recycling of end product by facilitating a reversing of the process of bonding.

Most important, in terms of membrane performance, the use of 100% solids in the form of finely divided particles, or low surface area cohesive scrims, do not compromise membrane breathability in the resultant bonded laminate. Discrete, discontinuous bonding also enhances softness and drapability in the final product.

The ability to use 100% solid adhesive products with a high viscosity at a low coat weight also ensures that it is possible to laminate an ultra-light weight nonwoven product, without the adhesive penetrating through the material. High viscosity products also display high physical and chemical resistance properties in use.

A FINELY DIVIDED, "POWDERED" HOT-MELT ADHESIVE SYSTEM:

An adhesive system of this kind would typically be of 50–200 micron particle size distribution, possibly up to 300 microns. The adhesive system may be cryogenically ground in its route to manufacture—depending upon the glass transition temperature of the polymer.

Materials in this category can include polyethylene (LDPE or HDPE). LDPE melt temperature is 100°–120° C.; Fusing temperature is 100°–150° C.: HDPE melt temperature is 125°–140° C.; Fusing temperature is 150°–180° C. Other polymers and copolymers include: ethylene vinyl acetate copolymer in which the proportion of vinyl acetate in the copolymer is 18–33% by weight; copolyamides with a melt temperature of 85°–140° C.; and copolyesters with a melt temperature range of 85°–125° C.—or higher. Other polymers less frequently used include polyvinyl chloride.

The most effective polymer cohesion is achieved between two substrates when the hot melt adhesive polymer type is compatible with the substrate. For example, a polyester substrate would be most effectively bonded by a condensation polymer system ie. copolymers of polyethylene terephthalate. A breathable polyethylene or polypropylene film with an additional polymer system e.g. polyethylene.

The powdered adhesive may be applied using a range of well recognized powder coating equipment/techniques to achieve various coating results. These would typically include Scatter coating; Powder-point coating; Paste-point coating; and Hot Melt print coating. These techniques result in a corresponding range of coating results including: Paste-point; sintered powderpoint; Calendered powderpoint; Double-point; Scattercoating; and Hot-melt print coating.

The equipment used to achieve this result is well recognized within the coating and laminating industry. These include: Paste-point printing in which fine powder (Particle size: 0–80 microns) is mixed in an aqueous dispersion and applied in discrete points using a rotary screen printing process (at typically 8–20 gsm) followed by a drying process. Powder-point coating (adhesive particle size <200 microns) using an engraved roll/hot press rolls followed by an oven system with convection drying and IR—drying to sinlet the product. Scatter coating, in which finely divided powder (Particle size—to suit application >50 microns)—is applied at typically 10–30 gsm using conventional Scatter units and an oven system; and finally, Hot-melt Print coating: in which granules are melted in an extruder and applied by silk screen printing process or gravure printing process. Here, the coating weight is typically 15–20 gsm, and the choice of stencil or engraved roll pattern can be selected to satisfy particular coating requirements.

These methods of coating are usually incorporated into a simple lamination process.

* ADHESIVE NONWOVEN BONDED FABRICS:

An alternative route to adhesive lamination involves the use of an adhesive "scrim" in the form of a Nonwoven bonded fabric. These are typically manufactured by the Spun-laid method using extruded thermoplastic polymers which melt at low temperatures. The adhesive scrims are placed between two fabrics that are to be laminated, and are activated by subjecting them to heat and pressure to make them stick together. Two Nonwoven or other materials can be quickly and permanently bonded in this way (E.g. Codor process).

(i) THERMOPLASTIC:

Thermoplastic adhesive scrims of typically 0.5–1.0 oz/sq. yd.—depending upon the density of the polymer—are used as the bonding medium. Copolyester and Copolyamide polymers, based on plasticiser-free formulations, are used in "Medium Melt" lamination applications with an MFI-characteristic which guarantees bonding between typically 105–130 C. (221–248 F.). Vinyl Acetate formulations are also available with Melting Ranges of typically 120–125 C.

Polymers including medium-low to high density polyethylene also offer excellent scrim bonding properties at typically 110–125 (230–257 F.) for LDPE and 130–140 C. (266–284 F.) for HDPE. Polypropylene products are available with melting ranges 165–170 F. (329–338 F.) for higher "Medium Melt" applications. Other polymers systems are occasionally used in this application.

(ii) THERMOSET:

Resistance to conditions of end-use application more extreme than those used in the lamination process can be achieved through the use of reactive hot melt systems including polyureathane bicomponent adhesives, or cross-linkable aqueous dispersions. These systems result in actual permanent chemical bonds cross-links formed between adhesive and substrate. Some difficulties may be experienced with these systems due to: inherent stability of the raw materials; low initial strength due to the time to undergo full chemical reactions; environmental concerns connected with the use of reactive species; and the recycling of material irreversibly bonded by thermoset systems.

As used herein, the term "thermoplastic polymer" refers only to conventional polymers, both crystalline and non-crystalline, which are melt processable under ordinary melt processing conditions and does not include polymers such as polytetrafluoroethylene which under extreme conditions, may be thermoplastic and melt processible. Suitable microporous films utilized in accordance with the present invention may be provided by the processes as defined in U.S. Pat. No. 4,867,881, issued Sep. 19, 1989, entitled "Orientated Microporous Film" which is hereby incorporated by reference.

Major limitations of prior porous film composites comprising layers, of microporous film and a second material include the ability to form a porous film composite which retains the vapor permeability of the porous film while at the same time not contributing greatly to the stiffness or bulk of the composite from the addition of the other material and avoidance of burn-through conditions and thermal bonding or blockage of the porosity of the porous film component either through adhesive or hot roll thermal bonding.

For example, porous film composites wherein webs are used to impart strength, especially in the cross-machine direction, the spun-bonded webs are typically non-uniform in basis weight and coverage such that the relatively thicker and thinner areas are easily recognized by the human eye. Attempts have been made to compensate for these poor fabric properties and limiting physical properties resulting from the non-conformity of basis weight and coverage by using spun bond webs having a heavier base weight than what would normally be required by the particular application. This problem also leads to burn-through of point thermal bonding materials, fabrication of composites with greater stiffness, increase bulk and other undesired features.

Thermal bonding technologies, in particular ultrasonic bondings are established tools in the industry utilizing thermoplastic materials. Use of ultrasonic energy in fabric and fiber bonding is well known and is best known in the textile industry for ultrasonically formed mattress pads and bed sheets via the pinsonic or pin point ultrasonic processing. The point bonding ultrasonic process has provided the foundation for using ultrasonic energy to laminate and/or form non-woven fabrics and products. The process has been successful because of the inherent advantages that generally apply to all welding of thermoplastic by ultrasound, including speed, efficiency, good bond integrity and elimination major melt zones.

Ultrasonic bonding presents only three process variables which are amplitude, pressure and time. Since the desired result is ultimately energy to melt and bond fibers, it can be simply stated that power is a function of ultrasonic horn vibration amplitude and pressure and that energy is a function of power used and time. These process variables are roughly established by prior experience and can be adjusted to meet the needs of the specific application which has desired melt depth, thickness of traveling webs and composites and adjustability of the ultrasonic horns in relationship to the traveling webs which are being thermally, i.e. ultrasonic point bonded. The dimensional relationship with a pattern roll which is in a fixed position having multiple pins mounted thereon defines in cooperation with the horn surfaces a gap for travel of the contacted webs and microporous films. Other variables that become fixed are web area, fiber type and amount of fiber. Within certain limits, the ultrasonic variables can be changed in relationship to one another in order to acquire a constant result. However, changes in nonultrasonic variables such as fiber type, blend or weight will require one or more new changes in the ultrasonic variabilities to ensure adequate energy to the bonded area.

A major difference in ultrasonic bonding and thermal bonding is that heat energy is not conducted through the fiber to be bonded but instead generated within the fiber itself, minimizing degradation of material through excessive heat. In addition, ultrasonic processing is faster with reported speeds in excess of 100 feet per minute. In general, the pattern roll with multiple pin extensions for grading pressure proximity of the ultrasonic horn surfaces are air cooled in order to avoid undue thermal buildup which would be detrimental to, for example, the microporous characteristics of the microporous film.

The ultrasonic bonding process in accordance to the invention for fabricating breathable non-woven composite barrier fabric utilizes a pattern roll which is in an affixed position having pins extending therefrom with approximate diameters of about 0.5 min. However the ultrasonic bonding apparatus can be improved by modifying dwell time through use of elongated pins of about the same cross-section, i.e. 0.5 mm. As the contacted webs and microporous film travel rate through the ultrasonic processing zone at 26 yards per minute, a contact time of the pin with the contacted webs and film is determined to be about 1.3 milli-seconds. Reduction of speed of travel of the contacted webs and microporous film will provide stronger bonding for lighter non-woven areas or lighter non-woven webs. In any case, the dwell time of the traveling contacted webs and microporous film through the ultrasonic bonding zone must be carefully controlled in order to avoid burn-through degeneration of the film and webs and the apparatus must have adjustability of the gap in order to accommodate the various thicknesses of materials presented in the contacted webs and films.

The breathable non-woven composite barrier fabric according to the invention can be utilized in cooperation with various additives such for example as antistatic compounds. Since many antistatic compound additives perform as wetting agents, generally the antistatic compounds are added to the web surface which will be next to the user, thus avoiding any wetting of the environmental surface which will be exposed to body fluids and the like. By adding the antistatic materials to the user side of the fabric, the performance criteria of the fabric is not compromised; however, selected known antistatic compounds having lesser wetting characteristics can be added to both sides of the fabric as long as the minimum fabric performance criteria is maintained. In addition the fabrics according to the invention can be sterilized for use in sterile environment requirements such as medical and certain laboratory and manufacturing operations. Depending on the thermoplastic polymers comprising the fabric, this sterilization can be achieved through, for example, radiation and chemical sterilization such as through the use of ethylene oxide. Ethylene oxide is preferable when utilizing polypropylene thermoplastic polymers, however, other suitable sterilization compounds and techniques can be utilized if such sterilization procedures do not compromise the minimum performance levels of the fabric.

The invention is further illustrated by the following examples, comparative examples and test procedure methods.

Emergency Standard Test Method for Resistance of Protective Clothing Materials to Synthetic Blood (ASTM ES21-92)

Workers, primarily those in the health care profession, involved in treating and caring for individuals injured or sick, can be exposed to biological liquids, capable of transmitting disease. The diseases, which may be caused by a variety of microorganisms, can pose significant risks to life and health. This is especially true of bloodborne Hepatitis B, Hepatitis C, and Human Immunodeficiency Viruses, which are related to Hepatitis and AIDS. Since engineering controls cannot eliminate all possible exposures, attention is placed on reducing the potential or direct skin contact through the use of protective clothing that resists penetration. Chemical molecular diffusion is not recognized as a transmission mode for microorganisms. This test method determines resistance to penetration of blood and other body fluids using synthetic blood.

Scope

This test method covers the determination of the resistance of protective clothing materials to penetration by biological liquids using synthetic blood under the condition of continuous liquid contact. Protective clothing material "pass/fail" determinations are based on visual detection of synthetic blood penetration.

This test method has been designed to measure the effectiveness of protective clothing barrier material properties using a synthetic blood mixture. It may be used as a preliminary screen for penetration of blood and other body fluids.

The synthetic blood mixture is prepared with a red dye to aid in visual detection and with a surfactant to simulate the surface tension of blood.

This test method may not apply to all forms or conditions of biological liquid exposure. Users of the test method should review tasks for worker/clothing exposure and assess the appropriateness of this test method for their specific applications.

The values in SI units shall be regarded separately as standard. The values stated in each system must be used independently of the other, without combining values in any way.

This standard does not purport to address all of the safety problems, if any, associated with its use. It is the responsibility of the user of this standard to establish appropriate safety and health practices and determine the applicability of regulatory limitations prior to use.

Summary of Test Method

This resistance of a protective clothing material to penetration by a biological liquid (synthetic blood) is determined using a modified form of Test Method F 903. The same test apparatus and specimen exposure format are used. Exposure Procedure C from Test Method F 903 is used for the test. This procedure subjects the material to synthetic blood at 0 psi for 5 minutes followed by 2 psi (13.6 kPa) for 1 minute followed by 0 psi for 54 minutes and noting whether visible penetration occurs.

In the test apparatus, the clothing material acts as a partition separating synthetic blood from the viewing side of the test cell.

A minimum of three specimens are tested. Results are reported as "pass/fail". Any evidence of synthetic blood penetration constitutes failure.

Significance and Use

This test method is based on Test Method F 903 for measuring resistance of chemical protective clothing materials to penetration by liquids. It is normally used to evaluate specimens from finished items of protective clothing.

Finished items of protective clothing include gloves, arm shields, apron, gowns, suits, hats, boots, and the like.

The phrase "specimens from finished items" encompasses seamed and other discontinuous regions as well as the usual continuous/regions of protective clothing items.

This test method can be used to identify protective clothing materials and constructions that limit exposures to biological liquids.

Protective clothing materials are intended to be barriers to blood and other body fluids that may contain infectious agent. The use of synthetic blood may not reflect the properties of all body fluids which can contain infectious agents. Therefore, in order to simulate the wetting characteristics of blood and body liquids, the surface tension of the synthetic blood is adjusted to approximate the lower end of the surface tension range.

This test method involves a qualitative determination of the protective clothing material resistance to penetration by synthetic blood under specific test conditions. It may be suitable for use as a material quality control or assurance procedure.

Part of the protocol for exposing the protective clothing material specimens with synthetic blood involves pressurization of the test cell to 13.8 kPa (2 psig). This pressure has been documented to discriminate between protective clothing material performance and correlate with visual penetration results that are obtained with a human factors validation.

Test Specimen

Each material specimen to be tested shall have a minimum dimension of 64 mm (2.5 in.). A 70 mm (2.8 in.) square is convenient.

A more simplified test showing approximately the same barrier test result are shown in the following elbow test procedure. Results of the ASTM blood barrier test and the elbow test are correlatable in general.

ELBOW TEST

Instructions for Using the Synthetic Blood Barrier Demonstration Kit

CAUTION: Synthetic blood will permanently stain clothing and skin. Use special care during the use of this kit.
1. Remove the ink pad from plastic bag.
2. Remove top from synthetic blood bottle and liberally apply the blood to the pad by gently squeezing the bottle.
3. Remove blotter paper and material samples from their respective plastic bags.
4. Place breathable non-woven composite barrier fabric swatch over the ink pad with the material's normal outside surface against the pad.
5. Place blotter paper, shiny (coated) side up, on top of material sample.
6. Firmly apply pressure to the blotter paper with elbow.
7. Remove the blotter paper and turn bottom side up for visual examination.
8. Stains on the blotter paper indicate blood strikethrough.

The non-woven composite fabric according to the invention must also provide in addition to the barrier performance, a water vapor transmission rate which is designated under ASTM E96-80, excerpts which are provided herein below. Standard Test Method for WATER VAPOR TRANSMISSION OF MATERIALS Designation: E96-80

Scope

These methods cover the determination of water vapor transmission (WVT) of materials through which the passage of water vapor may be of importance, such as paper, plastic films, other sheet materials, fiberboards, gypsum and plaster products, wood products, and plastics. The methods are limited to specimens not over 1¼ in. (32 mm) in thickness except as provided in Section 9. The two basic methods, Upright Cup and Inverted Cup Water Method, are provided for the measurement of permeance, and two variations include service conditions with one side wetted and service conditions with low humidity on one side and high humidity on the other. Agreement should not be expected between results obtained by different methods. That method should be selected which more nearly approaches the conditions of use.

Summary of Methods

In the Upright Cup Method the test specimen is sealed to the open mouth of a test dish containing distilled water and the assembly placed in a controlled atmosphere. Periodic weighings determine the rate of water vapor movement through the specimen.

In the Inverted Cup Water Method (water resting on specimen), the dish contains distilled water, and the weighings determine the rate of vapor movement through the specimen from the water to the controlled atmosphere.

Significance and Use

The purpose of these tests is to obtain, by means of simple apparatus, reliable values of water vapor transfer through permeable and semipermeable materials, expressed in suitable units. These values are for use in design, manufacture, and marketing. A permeance value obtained under one set of test conditions may not indicate the value under a different set of conditions. For this reason, the test conditions should be selected that most closely approach the conditions of use.

Moisture vapor transmission rates for fabrics or continuous materials are determined on a basis of grams per meter square per 24 hours. The one procedure since several procedures are used in the industry, the material to be tested is fastened over the mouth of a dish which contains water. The assembly is placed in an atmosphere of constant temperature of about 90° F. and a relative humidity of 50% plus or minus 5% and the weight loss of the assembly is used to calculate the rate of the moisture vapor permeability through the test material. The moisture vapor transmission rate (MVTR) is calculated as follows:

Moisture of Vapor Transmission Rate $(MVTR)=w\times 24(l)t\times a)$

Where:

w=weight loss (grams)

t=test time (hours)

a=exposed area of specimen (meters square)

The proceeding MVTR procedure was utilized and providing the performance data of Tables 1 and 2 below wherein various non-woven composite fabric materials were tested. As can be seen from Table 1 and Table 2, a variation of temperature from about 75° F. to about 87°–90° F. has a substantial impact on the MVTR. The rates are significantly enhanced beyond linear expectations when the temperatures are raised from 10°–20° F.

TABLE 1

MVTR Performance
Conditions: About 75° F. and about 65% relative humidity

| SAMPLE | MVTR (g/m² 24 hr) |
|---|---|
| 0.2 polypropylene web/polyethylene film/ 0.5 polypropylene web | 913 |
| 0.9 polypropylene web/polypropylene film/ 0.5 polypropylene web | 833 |
| 0.9 polypropylene web/polypropylene film/ 0.5 polypropylene web | 963 |

All data is for a 24 hour period and all samples shown were run together.

TABLE 2

MVTR Performance
Conditions: About 87° F. and about 46.4% relative humidity

| SAMPLE | MVTR (g/m² 24 hr) |
|---|---|
| polypropylene microporous film (no webs) | 2657 |
| 1.0 polypropylene web/polypropylene film/ 1.0 polypropylene web | 1965 |

All data is for a 24 hour period and all samples shown were run together.

Comparing temperature conditions of Tables 1 and 2 clearly illustrates the MVTR performance variations as a function of temperature for similar composites. As can also be seen from Table 2, a stand-alone microporous film of polypropylene at about 87° F. and 46.4% relative humidity provided an MVTR of 2657, however, such material does not have the strength to be utilized as a stand-alone material in for example medical fabric garment applications. Such films have a grab breaking strength of approximately 7.5 to about 9.0 pounds or an average of 8.2 pounds in machine direction and about an average of 10.4 in cross machine direction stretch microporous film.

The following tables, Tables 3–6 present various performance data for composite fabrics made in accordance to the present invention as well as comparative examples which are outside the scope of the present invention. In Table 3 thermal bonded breathable non-woven composite barrier fabrics were produced utilizing spaced-apart thermal bonds. The fabric materials included one sided as well as two-sided webs in cooperation with a polypropylene microporous film. The webs varied from 0.5 to 1.25 ounces per square yard weight and were comprised of polypropylene spun-bonded webs.

The examples of Table 4 illustrate ultrasonic bonding of, for example, multiple layers of microporous polypropylene films and polypropylene webs which perform according to the invention. However, examples 7–10 provide comparative data for composites which do not fall within the invention. For example, the polyethylene microporous film examples 7–9 whether provided by thermal point bonding or special ultrasonic point bonding fail the ASTM ES21 barrier test probably because of the melt or burn-through of the polyethylene microporous film. However, polyethylene microporous film does meet the ASTM ES21 barrier test when adhesively bonded to the webs in accordance to the invention, i.e. pattern or point bonding. The data in Table 5 illustrates adhesive bonding examples 11–13 which pass ES21 while continuing to maintain reasonable MVTR rates.

Comparative example 10 illustrates self bonded webs of polypropylene and polypropylene microporous film which are thermally bonded and do not meet the performance criteria of the present invention. In addition, the data of Table 4 present breaking strength in pounds according to ASTM D751. These breaking strengths are generally much lower when utilizing polyethylene microporous films versus for example 6 wherein polypropylene spun-bonded webs are combined with two microporous polypropylene films.

TABLE 3

| EXAMPLE NO. | 1 | 2 | 3 | 4 | 5 |
|---|---|---|---|---|---|
| Thermal Bonds | 0.5PP/MPP/0.5PP | 0.9PP/MPP/0.5PP | 1.0PP/MPP/1.0PP | 1.25PP/MPP/1.25PP | ONE SIDE 0.9PP/MPP |
| | Ultrasonic | Ultrasonic | Ultrasonic | Ultrasonic | Ultrasonic |
| ASTM ES 21 | Pass | Pass | Pass | Pass | Pass |
| MVTR g/m$^2$/24 hr** (ASTM E 96) | 706 | 720 | NA | 683 | 660 |
| BREAKING STRENGTH lbs: (ASTM D751) (Grab Method) | | | | | |
| MD | 27.8 | 37.0 | NA | 63.2 | 25.86 |
| XM | 21.2 | 26.5 | NA | 56.6 | 16.52 |

(See footnotes following Table 5 for abbreviation definitions.)

TABLE 4

| EXAMPLE NO. | 6 | 7 (Comparative) | 8 (Comparative) | 9 (Comparative) | 10 (Comparative) |
|---|---|---|---|---|---|
| Thermal Bonds | 0.5PP/MPP/0.5PP/MPP/0.5PP Ultrasonic | 0.9PP/MPE/0.5PP Ultrasonic | 1.0PP/MPE/0.5PP Ultrasonic | ONE SIDE SBPE/MPE Thermal (Point Bonded) | Self Bonded Webs 0.2PP/MPP/0.5PP Thermal (Point Bonded) |
| ASTM ES 21 | Pass | Fail | Fail | Fail | Fail 6 of 9 |
| MVTR g/m$^2$/24 hr** (ASTM E 96) | 599 | 667 | 602 | 457 | 768 |
| BREAKING STRENGTH lbs: (ASTM D751) (Grab Method) | | | | | |
| MD | 69.64 | 28.58 | NA | 19.88 | 25.24 |
| XM | 54.94 | 22.10 | NA | 19.08 | 19.30 |

(See footnotes following Table 5 for abbreviation definitions.)

TABLE 5

| EXAMPLE NO. | 11 | 12 | 13 |
|---|---|---|---|
| Adhesive Bonds | 0.9PP/MPE/1.0PP | 1.5PP/MPE | .9PP/MPP/1.0PP |
| ASTM ES 21 | Pass | Pass | Pass |
| MVTR g/m$^2$/24 hr** | 554 | 486 | 642 |
| BREAKING STRENGTH lbs: (ASTM D751) | | | |
| MD | 50.02 | 41.42 | NA |
| XM | 48.74 | 36.36 | NA |

*MD - Machine Orientation of the composite
XM - Cross Machine Orientation of the composite
*MPP - Microporous Polypropylene
*MPE - Microporous Polyethylene
*SBPE - Spunbonded Polyethylene
*PP - Non-woven Polypropylene
*Note that all numbers in the composite, (.9PP/MPP/.5PP), are the basis weights of the nonwoven in ounces per square yard. Also, the nonwoven is polypropylene unless it is otherwise noted.
**Ambient Room Condition of 75° F. ± 2° F. and 65% Relative Humidity ± 2% Relative Humidity (Upright Cup).

TABLE 6

| EXAMPLE NO. | 14 (Fabric according to invention) | 15 (Comparative commercial composites) SBPP/Meltblown PP/SBPP* | 16 (Comparative commercial composites) Spunlaced Woodpulp/Polyester |
|---|---|---|---|
| Resistance to synthetic blood penetration ASTM ES21 (pass/fail) | Pass | Fail | Fail |
| Hydrostatic Pressure Test Resistance to liquid penetration expressed in liquid column inches | 43+ | 20.7 | 9.6 |
| Bacterial Filtration Efficiency MIL Spec. | 99.9% | 81.3% | 63.3% |
| Moisture Vapor Transmission Rate Comfort test, expressed in grams per square meter per 24 hours. ASTM E96 | 1385 | 1794 | N/A |
| Standard classification for the flammability of wearing apparel NFPA Method 702 | Class I (Relatively slow burning) | Class I (Relatively slow burning) | Class 3 (Relatively flammable) |

*SBPP - Spun-Bonded Polypropylene

In Table 5, examples 11 and 12 present microporous polyethylene films and adhesive bonded webs of polypropylene which pass the barrier test under ASTM ES21 and have satisfactory MVTR ratings. Example 13 utilizing polypropylene microporous film and polypropylene spunbonded webs also pass the barrier and MVTR performance criteria and would fall within the scope of the present invention.

In Table 6, example 14, ultrasonic point bonding produced polypropylene webs sandwiching a polypropylene microporous film is presented. Examples 15 and 16 are comparative, commercial composites presently available on the market which fail the barrier test and as one would expect, have lower ratings on the bacteria filtration efficiency standard test based on MIL Spec. 36954C.

Comparative evaluations of the products according to the present invention, i.e. the blue material versus the comparative white material are evaluated as follows in a protein blocking test procedure.

PROTEIN BLOCKING TEST

Comparative Evaluation

Two materials, 0.9 PP/MPP Film/0.5 PP (Blue) and 0.9 PP/MPE Film/0.5 PP (White-comparative) were evaluated using the protocol as outlined below:

The edges of all test samples were sealed with paraffin to prevent leakage around the sides of the material. Test samples were then sealed in ASTM F739 cells which had been modified to couple a vacuum source to the normal collection inlet ports. A vacuum gauge was placed in line to continuously monitor differential pressure. 20.0 mL of a solution containing 0.5% gamma globulin (150,000 molecular weight fraction, Sigma Chemical Co.) in phosphate buffered saline (PBS) was added to the challenge side of each cell. For the 0.9 PP/MPE Film/0.5 PP (White) fabric, 380 mm Hg was applied to the collection side of each cell for 15 seconds. Approximately ⅓ of the original volume passed through the fabric within this interval. For the 0.9 PP/MPP Film/0.5 PP (Blue) material, 380 mm Hg was applied to the collection side of each cell for 60 minutes, with no visible flow of the protein solution through the fabric. The vacuum was then increased to 609 mm Hg for an additional 15 minutes, again with no visible flow of the protein solution through the fabric.

The concentrations of protein in the initial solution and in the filtrate from each test cell, were determined via BCA protein assay (kit available from Pierce). The BCA assay allows spectrophotometric determination of protein concentration by combining the Blueret reaction (protein reducing $CU^2$ in an alkaline medium to produce $Cu^1$) with bicinchoninic acid (BCA), which is highly sensitive and specific for the cuprous ion. The assay was performed according to the manufacturer's instructions, using the "enhanced protocol" in order to shorten incubation times. A standard curve was constructed using dilutions of BSA (bovine serum albumin) ranging from 5–30 ug. The test samples were diluted 1:20 with PBS so that the expected concentrations would fall in the same range as the standard curve.

Blanks were included for each fabric which consisted of using PBS (with no protein added) as the challenge solution, and following the procedure described above. Tests on each fabric were performed in triplicate.

For the 0.9 PP/MPP Film/0.5 PP (Blue) fabric, since no filtration was achieved, an estimate of greater than 99% blocking can be assumed. For the 0.9 PP/MPE Film/0.5 PP (White) material, the percent protein blocking for the three replicates was as follows:

| Cell 1 | Cell 2 | Cell 3 | Cell 4 |
|---|---|---|---|
| 4.6% | 7.4% | 8.4% | 6.8% |

The protein blocking test again illustrates a barrier phenomena wherein the breathable non-woven composite barrier fabric in accordance with the invention achieved 99% blockage of the protein while a product produced with a polyethylene microporous film substantially fails the barrier test.

Water permeability flow rates are presented showing a comparative composite utilizing a polyethylene microporous film versus the composite in accordance with the invention utilizing a polypropylene microporous film wherein both films and composites have been thermally bonded. It is quite clear from the flow test data that the polyethylene microporous film acts as a filter rather than a barrier and allows substantial flow of water.

| WATER PERMEABILITY (flow rate) | | |
|---|---|---|
| | liter/sq. M.hr @ 258 mmHg | liter/sq M.hr.atm |
| FLOW TEST WITH SCRIM BACKING: | | |
| Composite based on PE microporous film (comparative) | 171 | 502 |
| Composite based on PP microporous film | 19* | 57* |
| FLOW TEST WITHOUT SCRIM: | | |
| Composite based on PE microporous film (comparative) | 29,197 | 85,874 |
| Composite based on PP microporous film | 49* | 143* |

Test Conditions: 258 mmHg (5 psi) on a 2.26 inch diameter ASTM F903 penetration cell with and without a scrim backing to prevent expansion deformation of the composite fabric.
Samples were preconditioned by soaking in a 50/50 mix of methanol and distilled water followed by a rinse in distilled water.
Polyethylene sample: Composite of polyethylene microporous film ultrasonically bonded between layers of .9 oz/sy and .5 oz/sy spun-bonded polypropylene non-wovens.
Polypropylene sample: Composite of polypropylene microporous film ultrasonically bonded between layers of .9 oz/sy and .5 oz/sy spun-bonded polypropylene non-wovens.
Liter/sq M.hr.atm measurement assumes a linear relationship between flow rate and pressure.
No water droplets were observed with the polypropylene composite with or without scrim backing and most of the measured flow was attributed to cell leakage. Droplets were obvious on the polyethylene composite and water flowed in a shower head like effect when the test was conducted without the backing.
*Assumed apparatus leakage as substantial reason for water permeability.

Many microporous films may stop blood penetration, however, many of these same films will wet out to low surface tension liquids. This effect may be minimized by placing a thin kiss coat of breathable urethane on top of the smooth microporous film. The urethane adds repellency to the surface of the film without significantly affecting the MVTR of the microporous film. The above combination reduces the wetability to soapy water. Soapy water has low surface tension. Surface tension being defined as a measure of the degree to which a liquid can wet a material. The lower the surface tension, the more easily the liquid wets a material.

The combination of a microporous film with a thin urethane coating can then be laminated to a variety of suitable low cost substrates including spun bonded polypropylene. The advantage of the microporous film is that it greatly reduces the thickness of breathable urethane that otherwise would be necessary as a stand alone coating to a similar substrate. This has significant cost and competitive advantages.

Liquids commonly used in liquid challenge tests, such as water and saline, have different physical properties than blood and body liquids and do not wet or penetrate through protective materials as easily as blood and body liquids. Even using the whole blood of humans or animals may not be predictive of the wetting and penetration characteristics of the entire range of potentially infectious human body liquids. The surface tension range of human blood and body liquids, excluding saliva, is 42 to 60 dynes per centimeter. Water and saline, which are poor body liquid models but are often used in testing materials, have surface tensions of 72 and 74 dynes per centimeter, respectively. A more appropriate body liquid model would have a surface tension approximating the low end of the blood and body liquid range and would be more predictive of the penetration characteristics of body liquids and other liquids with higher surface tensions.

Most liquid challenge test methods have specific time and pressure protocols and are conducted for shorter periods of time than the anticipated time of liquid challenge in surgery. The time of the liquid challenge test should be meaningful and representative of the end use application for the surgical gown or drape. It is generally agreed that shorter times may be necessary with higher liquid challenge pressures to achieve definitive test results.

The condition of the surgical gown or drape at the time of the liquid challenge test is very important. Liquid challenge testing prior to degradation by physical, chemical, and thermal stresses which could negatively affect the protective qualities of the material may lead to false prediction of actual in-use performance. The ultimate purpose for protective materials is to form an effective barrier to liquids and microorganisms throughout their entire use in surgery. The impact of other physical, chemical, and thermal stresses imposed during use in surgery and during reprocessing of multiple-use materials should be assessed. Physical stresses could included such things as stretching and relaxation, mechanical flexing, and abrasion. Chemical stresses could include such things as exposure to other clinical liquids, skin disinfectants and lubricants, irrigation fluids, perspiration, and body oils. Thermal stresses could include such things as direct contact with hot instruments and contact with high-energy devices such as electrocautery knives and lasers.

Liquid challenge tests can be useful prescreening tools in determining which protective materials warrant further investigation with microbiological challenge tests such as ASTM ES22- 92.

Emergency Standard Test Method for Resistance of Protective Clothing Materials to Penetration by Blood-Borne Pathogens Using Viral Penetration as a Test System

ASTM ES22-92

Scope 1.1 This test method is used to measure the resistance of protective clothing materials to penetration to blood-borne pathogens by using a surrogate microbe under the condition of continuous liquid contact. Protective clothing "pass/fail" determinations are based on detection of viral penetration.

1.1.1 This test method may not be effective in testing protective clothing materials having thick, inner liners which readily absorb the liquid assay fluid.

1.2 The test method has been designed to measure the effectiveness of protective clothing material against blood-borne pathogens using a microbiological model.

1.2.1 The chosen stimulant, bacteriophage Phi-X174 was selected as the most appropriate model for blood-borne pathogens because of its small size, spherical morphology, environmental stability, non-human infectivity, high assay sensitivity, rapid assay and high tiler.

1.2.2 Bacteriophage Phi-X174 best approximates Hepatitis C virus in size but also may be used as a surrogate for Hepatitis B virus and the Human Immunodeficiency Virus (HIV).

1.3 This test method may not apply to all forms or conditions of blood-borne pathogen exposure. Users of the test method should review modes for worker/clothing exposure and assess the appropriateness of this test method for their specific applications.

1.4 The values state in S1 units or in other units shall be regarded separately as standard. The values stated in each system must be used independently of the other, without combining values in any way.

1.5 This standard does not purport to address all of the safety problems, if any, associated with its use. It is the responsibility of the user of this standard to establish appropriate safety and health practices and determine the applicability of regulatory limitations prior to use.

The following describes details and results for microbiological viral penetration testing of protective clothing materials, which are to be used to protect against bloodborne pathogen hazards. The test procedure was adapted from the ASTM ES 22 procedure developed by the ASTM Subcommittee F23.40 on Biological Hazards. The test device used in this procedure was the ASTM F903 Chemical Penetration Cell.

The bloodborne pathogens of major concern are the hepatitis B virus (HBV), hepatitis C virus (HCV) and human immunodeficiency virus (HIV). HBV is enveloped, spherical, and 42–47 nm (nanometers) in size. HCV has no envelope, icosahedral morphology, and is 27–30 nm in size. HIV is enveloped, spherical, and is 80–110 nm in size. The blood serum concentrations of these three bloodborne pathogens ranges from less than 100 to more than 100 million IU/mL (infectious units per milliliter). The øX174 bacteriophage is one of the smallest known viruses. It has no envelope, has icosahedral morphology, and is 25–27 nm in size. The øX174 bacteriophage challenge suspension will be maintained at a concentration of at least $1.0 \times 10^8$ PFU/mL (plaque forming units/mL).

Test specimens were challenged with approximately 60 mL of a øX174 bacteriophage suspension for 5 minutes at atmospheric pressure, 1 minute at 2.0 PSIG (13.8 kPa), and 54 minutes at atmospheric pressure or until liquid penetration was observed. At the conclusion of the test, the observed side of the test specimen was rinsed with a sterile assay medium and then assayed for the presence of the øX174 bacteriophage. The surface tension of the challenge suspension and the assay medium was adjusted to approximately 40–44 dynes/cm using surfactant-type Tween® 80 at a final concentration of approximately 0.01% by volume. JUSTIFICATION:

The protective clothing materials tested are intended to provide protection against blood, body fluids, and other potentially infectious materials. The surface tension range for blood and body fluids is approximately 42–60 dynes/cm. Therefore, in order to simulate the wetting characteristics of blood and body fluids the surface tension of the øX174 bacteriophage suspension was adjusted to approximate the lower end of this surface tension range (40–44 dynes/cm).

The choice of a microbiological model to evaluate the effectiveness of the bloodborne pathogen barrier properties of protective clothing materials is important. There are problems associated with utilizing the actual bloodborne pathogens as test organisms. HBV and HCV cannot be grown in the laboratory. HIV represents a significant safety and liability consideration due to its high infectivity potential and requirements for extreme and expensive precautions.

Therefore, a model for the bloodborne pathogens was researched. The ideal properties of a surrogate would include small size, spherical or polyhedral (round) morphology, environmental stability, low or non-human infectivity, high assay sensitivity, rapid growth, and high titer. The øX174 bacteriophage was selected as the most appropriate surrogate for the bloodborne pathogens mentioned because it satisfies all of these criteria. The øX174 bacteriophage has no envelope and is 25–27 nm in size [similar to HCV the smallest pathogen], has an icosahedral or nearly spherical morphology similar to all three viral pathogens mentioned, has excellent environmental stability, is non-infectious to humans, has a limit of detection which approaches a single virus particle, grows very rapidly (assay results can be read within as little as 4–8 hours), and can be cultivated to reach very high liters similar to HBV (the most concentrated pathogen mentioned).

Animal virus surrogates are not used as they require specialized cell culture and enzyme assay techniques. In addition, the stability of most of the animal viruses is less than desirable and plating efficiency is low or unknown.

Despite the variety of viral coats or surfaces (i.e., lipophilic, hydrophilic, etc.,) they generally perform similarly in barrier or penetration tests. This is because viruses adopt the charge of the liquid in which they are suspended and are more affected by the liquid vehicle than by their own physical or chemical properties.

It is also important to note that blood as the test vehicle, while it may seem appropriate, is actually a poor choice. Many viruses absorb to blood cells. Red blood cells are about 7–10 nm in diameter and can actually plug pores. Since many other body fluids can be infectious, it is more sever to use a body fluid stimulant (surfactant containing, particulate-free suspending liquid) such as that described in this procedure.

TEST SPECIMEN PREPARATION:

Three specimens (approximately 75 mm×75 mm) were cut at random from each sample submitted for testing. Test specimens were gas sterilized with Ethylene Oxide (12/88) and degassed according to the following parameters:

| | |
|---|---|
| Preconditioning: | 30 minutes minimum. |
| Temperature: | 52° C. ± 2° C. |
| Relative Humidity: | 55 ± 10%. |
| Gas Pressure: | 15 PSIG |
| Exposure Time: | 8 hours minimum. |
| Degassing Time: | 48 hours minimum @ 54° C. ± 2° C. |

Prior to testing, all test specimens were conditioned for a minimum of 24 hours at 21° C.±5° C. and 30% to 80% Relative Humidity.

CHALLENGE PREPARATION:

The øX174 bacteriophage stock culture was prepared by inoculating a 100 mL aliquot of nutrient broth with *E. coli* C and incubating at 37° C.±2° C. with rapid shaking for 6–18 hours.

A 1:100 dilution of the overnight culture was prepared and incubated at 37° C.±2° C. until the culture had grown to a density of ≈2–4×10⁸ CFU/ml (about 5 hours). This cell density corresponded to an optical density of 0.3–0.5 on a spectrophotometer set at 640 nm. The *E. coli* C culture was inoculated with a 5–19 ml aliquot (per 100 ml of culture) of the øX174 bacteriophage stock (ATCC#13706-B1) and incubated with rapid shaking for 1 to 5 hours at 37° C.±2°

C. Complete lysis of the host bacteria was noted with the broth cleared. The virus suspension was centrifuged at 10,000×G for 20 minutes and the supernatant was filtered through a sterile 0.45 μm filter and then through a 0.22 μm filter to remove the host cell debris. The øX174 stock culture was kept refrigerated at 2°–8° C. The liter of the stock culture was periodically determined to verify concentration.

The øX174 challenge suspension was prepared by diluting the øX174 stock culture in sterile nutrient broth with 0.01% Tween® 80 to provide a challenge concentration of $\geq 1 \times 10^8$ PFU/mL and a final surface tension of 40–44 dynes/cm.

TEST PROCEDURE:

Prior to testing, the penetration test cells were steam sterilized at 121° C. for 30 minutes minimum. This included the cell support, Teflon® cell, gaskets, retaining screen (optional), drain valve, airline connector, stainless steel flange, and nuts. After the test cells cooled to room temperature, the sterile test specimen was placed into the penetration cell with the normal outside surface of the specimen oriented toward the test cell reservoir, using exposure option A from Table 7. The inner side surface of the specimen was observed for liquid penetration. The layers were clamped into the test cell in the following order:

Teflon® cell.
Gasket.
Test sample.
Gasket.
Retaining screen (optional).
Gasket.
Stainless steel flange.

Each of the bolts were torqued to 120 inch pounds, using a criss-cross technique. The penetration test cell was placed into the test apparatus and the drain valve closed. The test cell reservoir was filled with approximately 60 mL of the øX174 challenge suspension. The exposed surface of the test specimen was observed for liquid penetration for 5 minutes at atmospheric pressure. If liquid penetration was observed the test was terminated and the test specimen was assayed for øX174 penetration.

The air line was connected to the test cell at the top port. The air regulator was opened slowly to 2.0 PSIG (13.8 kPa) and the surface of the specimen was observed for liquid penetration. If liquid penetration was observed, the test was terminated immediately and test specimen was assayed for øX174 penetration. The pressure was held constant (2.0 PSIG) for exactly 1 minute and the surface of the test specimen was monitored for the appearance of liquid penetration. If liquid penetration was observed, the test was terminated immediately and the surface of the test specimen was assayed for øX174 penetration. The pressure regulator was turned to release the pressure in the test cell and the air line disconnected. The test cell was allowed to sit for 54 minutes at atmospheric pressure and the surface of the specimen was periodically observed for liquid penetration.

To comply with the ASTM ES 22 Test Method, three replicate specimens were tested for each type of protective clothing material submitted.

TEST CONTROLS:

A negative control specimen was also included in the study to show that a negative result could be obtained consistently for some impervious materials when challenged with the øX174 bacteriophage. The negative control material used was a sterile 2 MIL polyethylene film that has consistently allowed no øX174 penetration when tested according to this procedure.

A positive control was also included in the study to show that the øX174 bacteriophage could be recovered using the assay procedure described. The positive control specimen consisted of a 0.040 μm microporous membrane that has consistently allowed øX174 penetration to occur.

Fallout plates were included for each set of specimens. The fallout plates consisted of bottom agar overlaid with top agar and E. coli C. The fallout plates were strategically placed on the work bench area to determine the background counts (if any) from airborne contamination.

ASSAY PROCEDURE:

At the conclusion of the 54 minute test interval or when liquid penetration was observed, the drain valve was opened and the challenge drained from the test cell reservoir. The challenge collected from the test cells was assayed to determine the final concentration of the challenge suspension.

The test cell was turned into a horizontal position and a 5 mL aliquot of sterile nutrient broth with 0.01% Tween® 80 was placed onto the surface of the test specimen. The test cell was gently swirled for approximately 1 minute to ensure contact of the assay fluid with the entire viewing surface of the test specimen. The assay fluid was removed with a sterile pipette and placed into a sterile test tube. The collected fluid was then assayed for øX174.

PLAQUE ASSAY PROCEDURE:

A 0.5 mL aliquot of the assay fluid was placed into triplicate tubes containing 2.5 mL of molten top agar held at 45° C.±2° C. A 1–2 drop aliquot of E. coli C was added to each tube and contents mixed and poured over the surface of bottom agar plates. After the agar solidified on a level surface, the plates were incubated at 37° C.±2° C. for 12–24 hours. The length of time depended on having the plaques large enough to count but not merging.

RESULTS:

All assay titers are reported along with the challenge concentrations for each set of test specimens. All challenge concentrations were maintained at $\geq 1 \times 10^8$ PFU/mL.

Triplicate specimens of microporous polypropylene film NT/0.9 oz spunbond showed no øX174 penetration in the assay media, indicating that the specimens provided effective protection against viral penetration under the test conditions specified in this report. All test specimens are designated as "PASS" in Table 8.

The results of the negative control specimen (2 MIL polyethylene) showed no øX174 penetration, indicating that the 2 MIL polyethylene film control provided effective protection against viral penetration under the test conditions specified in this report and that the laboratory technician exercised proper care in performing the procedure. The positive control specimen (0.040μ microporous membrane) showed significant øX174 penetration on the assay plates, indicating that the specimen allowed the øX174 challenge to penetrate the specimens. This also demonstrated that the assay procedure was effective in recovering the øX174 challenge from the surface of the test specimen. Refer to Table 9 for a summary of the results of the test controls.

TABLE 7

Specimen Exposure Procedure

| Procedure | Pressure/Time Sequence and Retaining Screen Options |
|---|---|
| A | 0 PSIG for 5 minutes, followed by 2.0 PSIG for 1 minute, followed by 0 PSIG for 54 minutes. A retaining screen is not used to support the specimen. |
| B | 0 PSIG for 5 minutes, followed by 2.0 PSIG for 1 minute, followed by 0 PSIG for 54 minutes. A retaining screen is used to support the specimen. |
| C | 0 PSIG for 5 minutes, followed by a pressure >2.0 |

TABLE 7-continued

Specimen Exposure Procedure

| Procedure | Pressure/Time Sequence and Retaining Screen Options |
|---|---|
|  | PSIG for 1 minute, followed by 0 PSIG for 54 minutes. A retaining screen is not used to support the specimen. |
| D | 0 PSIG for 5 minutes, followed by a pressure >2.0 PSIG for 1 minute, followed by 0 PSIG for 54 minutes. A retaining screen is used to support the specimen. |

TABLE 8

Viral Penetration Results
ASTM Method ES 22
Exposure Procedure Used: A
MATERIAL ID: Microporous Polypropylene Film NT/0.9 oz spunbond

| REP # | SPECIMEN THICK- NESS\ | CHALLENGE CONCENTRATION (PFU/mL) | ASSAY TITER (PFU/mL) | TEST RE- SULT |
|---|---|---|---|---|
| #1 | 0.05 mm | $1.82 \times 10^8$ | <1* | Pass |
| #2 | 0.04 mm | $1.82 \times 10^8$ | <1 | Pass |
| #3 | 0.05 mm | $1.82 \times 10^8$ | <1 | Pass |

*A value of <1 PFU/mL is reported for assay plates showing no plaques.
\The specimen thicknesses reported do not include the 0.9 oz spunbond. The spunbond was included only as a support for the membrane

TABLE 9

Viral Penetration Results
ASTM Method ES 22
Exposure Procedure Used: A
Test Controls

| CONTROL SPECIMENS | CHALLENGE CONCENTRA- TION (PFU/mL) | ASSAY TITER (PFU/mL) | TEST RESULT |
|---|---|---|---|
| Negative Control #1 | $2.14 \times 10^8$ | <1* | Pass |
| Positive Control #1 | $2.14 \times 10^8$ | $2.44 \times 10^2$ | Fail |
| Negative Control #2 | $1.82 \times 10^8$ | <1 | Pass |
| Positive Control #2 | $1.82 \times 10^8$ | 58 | Fail |

*A value of <1 PFU/mL is reported for assay plates showing no plaques.

The "PASS" of all test specimens of Table 8 clearly presents the microporous polypropylene films as suitable for blocking, for example, blood-borne pathogens using viral penetration as a test system under ASTM ES22-92. These same microporous films exhibit desirable MVTR, allowing the long term use of garments based on these films by medical personnel without discomfort. The use of these films with a thin kiss coat of breathable urethane bonded thereto presents wet out from low surface tension liquids. The bonding of the thin coat of urethane can be, for example, by adhesive bonding. In addition, these combinations can also be bonded with nonwovens in order to form other suitable composites having strength, protection and wearer comfort. Substantially all composite combinations formed of the microporous film which do not interfere with the film MVTP or ES-22 barrier characteristics will be suitable for use in medical and clean room environments.

The non-porous polyethylene of Table 9 provides a suitable barrier under ES-22 testing; however, such non-porous materials have no or very small MVTP. Such low level MVTP materials are not suitable for uses in day to day medical or related environments due to body sweat build-up and related discomforts.

The preceding examples and comparative examples and test procedure discussions are not to be understood as limiting to the scope of the present invention, the scope of the present invention being limited only as indicated by the pending claims.

What is claimed is:

1. A non-woven composite fabric comprising:

a microporous thermoplastic film having at least one film surface adhesive bonded to a layer of non-woven thermoplastic materials, the bonding occurring at multiple spaced-apart locations through the agency of specifically introduced adhesive material;

said composite fabric having a barrier to passage of biological liquid when the composite fabric is subjected to contact with synthetic blood at zero psi for 5 minutes followed by synthetic blood contact at 2 psi (13.6 kpa) for one minute followed by synthetic blood contact at zero psi for fifty-four minutes, said composite fabric exhibiting no visible penetration of synthetic blood;

said non-woven composite fabric having a moisture or vapor transmission rate of greater than about 450 grams per square meter for twenty-four hours at about 75° F. and about 65% relative humidity; and said non-woven composite fabric having a breaking strength of at least about 14 pounds per inch.

2. A non-woven composite fabric according to claim 1, wherein the thermoplastic microporous film has a thermoplastic non-woven layer of the same or different materials adhesive bonded to a first surface of the microporous film and a second surface of the microporous film.

3. A non-woven composite fabric according to claim 1, wherein said thermoplastic comprises polyolefins or copolymers of polyolefins.

4. A non-woven composite fabric according to claim 1, wherein said thermoplastic non-woven layers which are spun-bonded, have a grab strength in machine direction of at least 6.5 pounds to break, cross-directional of at least 5 pounds to break.

5. A non-woven composite fabric according to claim 2, wherein a first and second layer of thermoplastic non-woven materials have individual layer weights of at least 0.2 ounces per square yard to about 2.5 ounces per square yard.

6. A non-woven composite fabric according to claim 5, wherein the thermoplastic non-woven layer intended to be exposed to use environment is thicker than the layer intended to be exposed to a user.

7. A non-woven fabric according to claim 2, wherein the moisture or vapor transmission is unaffected or enhanced when the non-woven layer on a first surface of the microporous film includes anti-static components and the non-woven composite fabric continues to provide a barrier to passage of biological liquids contacted to a non-woven layer bonded to a second microporous film surface.

8. A non-woven composite fabric according to claim 1, having at least two microporous films having individual layers of non-woven materials adhesive bonded to a first and second surface of a first microporous film and a first and second surface of a second microporous film, the layers and microporous films being bonded by adhesive material together to form the non-woven composite fabric.

9. A non-woven composite fabric according to claim 2, wherein the first and second layer of thermoplastic nonwoven materials bonded to a first and a second surface of a polyolefin microporous film are comprised of polyolefins and the layers have the same thickness or different thicknesses.

10. A non-woven composite fabric according to claim 3, wherein the microporous film is comprised of polyethylene and the individual layers of non-woven are comprised of the same or different polyolefins.

11. A non-woven composite fabric according to claim 3, wherein the individual non-woven layers are comprised of the same or different polyolefins and adhesively bonded to a first and second surface of a polypropylene microporous film.

12. A process for forming an adhesive bonded non-woven composite fabric having a moisture or vapor transmission rate of greater than about 240 grams per square meter for 24 hours at about 75° F. and about 65% relative humidity, said fabric providing a barrier to passage of biological liquid when the composite fabric is subjected to contact with synthetic blood at 0 psi for 5 minutes followed by synthetic blood contact at 2 psi (13.6 kpa) for 1 minute followed by synthetic blood contact at 0 psi for 54 minutes, said composite fabric exhibiting no visible penetration of the synthetic blood; said composite fabric having a breaking strength of at least 14 pounds per inch;

said process comprising:

unwinding at least one continuous thermoplastic non-woven web and at least one continuous thermoplastic microporous film;

inserting adhesive bonding materials at multiple spaced-apart locations between the continuous thermoplastic non-woven web and the continuous thermoplastic microporous film;

contacting a side of the at least one thermoplastic non-woven web adjacent to said adhesive bonding material to a side of the continuous thermoplastic microporous film;

continuously transporting said contacted web and film adjacent to said adhesive bonding material through an adhesive curing zone, said curing zone providing a dwell time sufficient to cure said adhesive without degrading either the film or webs.

13. The process according to claim 12 wherein the continuous thermoplastic non-woven webs are comprised of the same or different polyolefins.

14. The process according to claim 12 wherein the continuous thermoplastic microporous film is comprised of a polyolefin.

15. The process according to claim 14 wherein the microporous polyolefin film is comprised of polyethylene.

16. The process according to claim 14 wherein the microporous polyolefin film is comprised of polypropylene.

17. The process according to claim 14 wherein the contacted web and film are adhesively bonded at multiple spaced-apart locations comprised of points.

18. The process according to claim 14 wherein the contacted web and film are adhesively bonded at multiple spaced-apart locations comprised of patterned lines.

19. A non-woven composite fabric comprising:

a microporous thermoplastic film having at least one film surface adhesive bonded to a layer of non-woven thermoplastic material, the bonding occurring at multiple spaced-apart locations through the agency of specifically introduced adhesive material;

said composite fabric having a barrier to passage of biological liquid when the composite fabric is subjected to contact with synthetic blood at zero psi for 5 minutes followed by synthetic blood contact at 2 psi (13.6 kpa) for one minute followed by synthetic blood contact at zero psi for fifty-four minutes, said composite fabric exhibiting no visible penetration of synthetic blood;

the composite fabric providing a barrier to viral penetration when the composite fabric is subject to contact with ØX174 bacteriophage suspension at a titer of $10^8$ PFU/mL for 5 minutes with no applied pressure, 1 minute at 13.8 kPa (2.0 PSIG), and 54 minutes with no applied pressure; and said non-woven composite fabric having a moisture or vapor transmission rate of greater than about 450 grams per square meter for twenty-four hours at about 75 degrees F and about 65% relative humidity.

20. A non-woven composite fabric according to claim 19, wherein the thermoplastic microporous film has a thermoplastic non-woven layer of the same or different materials adhesive bonded to a first surface of the microporous film and a second surface of the microporous film.

21. A non-woven composite fabric according to claim 19, wherein said thermoplastic comprises polyolefins or copolymers of polyolefins.

22. A non-woven composite fabric according to claim 19, wherein said thermoplastic non-woven layers which are spun-bonded, have a grab strength in machine direction of at least 6.5 pounds to break, cross-directional of at least 5 pounds to break.

23. A non-woven composite fabric according to claim 20, wherein a first and second layer of thermoplastic non-woven materials have individual layer weights of at least 0.2 ounces per square yard to about 2.5 ounces per square yard.

24. A non-woven composite fabric according to claim 23, wherein the thermoplastic non-woven layer intended to be exposed to use environment is thicker than the layer intended to be exposed to a user.

25. A non-woven composite fabric according to claim 20, wherein the moisture or vapor transmission is unaffected or enhanced when the non-woven layer on a first surface of the microporous film includes anti-static components and the non-woven composite fabric continues to provide a barrier to passage of biological liquids contacted to a non-woven layer on a second microporous film surface.

26. A non-woven composite fabric according to claim 19, having at least two microporous films having individual layers of non-woven materials adhesive bonded to a first and second surface of a first microporous film and a first and second surface of a second microporous film, the layers and microporous films being bonded by adhesive material together to form the non-woven composite fabric.

27. A non-woven composite fabric according to claim 20, wherein the first and second layer of thermoplastic non-woven materials bonded to a first and a second surface of polyolefin microporous film are comprised of polyolefins and the layers have the same thickness or different thicknesses.

28. A non-woven composite fabric according to claim 21, wherein the microporous film is comprised of polyethylene and the individual layers of non-woven are comprised of the same or different polyolefins.

29. A non-woven composite fabric according to claim 21, wherein the individual nonwoven layers are comprised of the same or different polyolefins and adhesively bonded to a first and second surface of a polypropylene microporous film.

30. A process for forming an adhesive bonded non-woven composite fabric having a moisture vapor transmission rate of greater than 450 grams per square meter for 24 hours at about 75° F. and about 65% relative humidity, said fabric providing a barrier to passage of biological liquid when the composite fabric is subjected to contact with synthetic blood at 0 psi for five minutes followed by synthetic blood contact of 2 psi (13.6 kpa) for 1 minute followed by synthetic blood at 0 psi for 54 minutes, said composite fabric exhibiting no visible penetration of the synthetic blood; said composite fabric providing a barrier to viral penetration when the composite is subject to contact with ØX174 bacteriophage suspension at a titer of $10^8$ PFU/mL for five minutes with no applied pressure, one minute of 13.8 kpa (2.0 PSIG), and fifty-four minutes with no applied pressure; said process comprising:

- unwinding at least one continuous thermoplastic non-woven web and at least one continuous thermoplastic microporous film;
- inserting adhesive bonding materials at multiple spaced apart locations between the continuous thermoplastic non-woven web and the continuous thermoplastic microporous film; contacting a side of the at least one thermoplastic non-woven web adjacent to said adhesive bonding materials to a side of the continuous thermoplastic microporous film adjacent to said adhesive bonding material; and
- continuously transporting said contacting web and film adjacent to said adhesive bonding materials through an adhesive bonding zone providing a dwell-time sufficient to cure said adhesive without degrading either film or webs.

31. A process according to claim 30 wherein the said composite fabric has a breaking strength of at least 14 pounds per inch.

32. The process according to claim 30 wherein the adhesive bonding materials inserted at multiple spaced apart locations is associated with the thermoplastic bonded non-woven layer.

33. The process according to claim 30 wherein the contacted web and film are adhesively bonded by randomly orientated spaced apart lines comprising polyolefin polymer thermoplastic adhesive.

34. The process according to claim 30 wherein the contacted web and film are adhesively bonded by randomly orientated spaced apart lines comprising polyester copolymer thermoplastic adhesive.

35. The process according to claim 30 wherein the contacted web and film are adhesively bonded by randomly orientated spaced apart lines comprising polyamide copolymer thermoplastic adhesive.

36. The process according to claim 30 wherein the contacted web and film are adhesively bonded by randomly orientated spaced apart lines comprising ethylene vinyl acetate copolymer thermoplastic adhesive formulations in which the proportion of vinyl acetate in the copolymer is 18–33% by weight.

37. The process according to claim 30 wherein the contacted web and film are adhesively bonded by randomly orientated spaced apart lines comprising polypropylene polymer thermoplastic adhesive.

38. The process according to claim 30 wherein the contacted web and film are adhesively bonded by randomly orientated spaced apart lines comprising copolyester copolymer thermoplastic adhesive.

39. The process according to claim 30 wherein the contacted web and film are adhesively bonded by randomly orientated spaced apart lines of a hydrophilic polyester film thermoplastic adhesive.

40. The process according to claim 30 in which the insertion of bonding materials at multiple spaced apart locations between the continuous thermoplastic non-woven web and continuous thermoplastic microporous film is achieved by unwinding an adhesive scrim and interposing the adhesive scrim between said nonwoven mesh and said microporous film.

41. The process according to claim 30 wherein the insertion of bonding materials is achieved by a scatter coating of a to be superposed surface of said non-woven web or said microporous film.

42. The process according to claim 30 wherein the insertion of bonding materials is achieved by paste point coating of fine powder (0–80 microns) mixed to an aqueous dispersion and coated at 5–20 gsm.

43. The process according to claim 30 wherein the insertion of bonding materials is achieved by hot melt adhesive point coating.

44. The process according to claim 30 wherein the contacted web and film are adhesively bonded at multiple spaced apart locations comprised of points is achieved by point coating of adhesive from art aqueous solution.

45. The process according to claim 30 wherein the contact web and film are adhesively bonded at multiple spaced apart locations provided by the insertion of a web composed of thermoplastic material.

46. The process according to claim 30 wherein the contact web and film are adhesively bonded at multiple spaced apart locations in the form of patterned lines.

47. A non-woven composite fabric comprising:

- a microporous film having at least one film surface coated with a thin layer of breathable urethane and one film surface bonded to a layer of thermoplastic materials, the bonding occurring at multiple spaced apart locations through the agency of specifically introduced adhesive material;
- said composite fabric having a barrier to passage of biological liquid when the composite fabric is subjected to contact with synthetic blood at zero psi for 5 minutes followed by synthetic blood contact at 2 psi (13.6 kpa) for one minute followed by synthetic blood contact at zero psi for fifty-four minutes, said composite fabric exhibiting no visible penetration of synthetic blood;
- the composite fabric providing a barrier to viral penetration when the composite fabric is subject to contact with ØX174 bacteriophage suspension at a titer of $10^8$ PFU/mL for 5 minutes with no applied pressure, 1 minute at 18.8 kPa (2.0 PSIG), and fifty-four minutes with no applied pressure;
- a non-woven composite fabric having a moisture or vapor transmission rate of greater than about 450 grams per square meter for twenty-four hours at about 75° F. and about 65% relative humidity; and
- the microporous film coated with breathable urethane having resistance to low surface tension liquid wet out.

48. A composite fabric according to claim 47 wherein the polyolefin microporous film is comprised of polypropylene.

* * * * *

UNITED STATES PATENT AND TRADEMARK OFFICE
CERTIFICATE OF CORRECTION

PATENT NO. : 5,560,974

DATED : October 1, 1996

INVENTOR(S) : John D. Langley

It is certified that error appears in the above-indentified patent and that said Letters Patent is hereby corrected as shown below:

Column 29, line 6, after "blood" add --- contact ---.

Column 30, line 17, delete the word "paste".

Column 30, line 26, delete "art" and insert --- an ---.

Signed and Sealed this

Eighteenth Day of March, 1997

Attest:

BRUCE LEHMAN

Attesting Officer

Commissioner of Patents and Trademarks